US012700523B2

(12) United States Patent
McLaughlin et al.

(10) Patent No.: US 12,700,523 B2
(45) Date of Patent: Aug. 4, 2026

(54) SELF-CENTERING VOLTAGE STANDOFF

(71) Applicant: Applied Materials, Inc., Santa Clara, CA (US)

(72) Inventors: Adam M. McLaughlin, Merrimac, MA (US); Craig R. Chaney, Gloucester, MA (US)

(73) Assignee: Applied Materials, Inc., Santa Clara, CA (US)

( * ) Notice: Subject to any disclaimer, the term of this patent is extended or adjusted under 35 U.S.C. 154(b) by 400 days.

(21) Appl. No.: 18/206,907

(22) Filed: Jun. 7, 2023

(65) Prior Publication Data

US 2024/0412899 A1 Dec. 12, 2024

(51) Int. Cl.
*H01B 17/32* (2006.01)
*H01B 17/16* (2006.01)

(52) U.S. Cl.
CPC ............. *H01B 17/32* (2013.01); *H01B 17/16* (2013.01)

(58) Field of Classification Search
CPC ...... H01B 17/00; H01B 17/005; H01B 17/14; H01B 17/16; H01B 17/24; H01B 17/32; H01J 37/00; H01J 37/30; H01J 37/3171
See application file for complete search history.

(56) References Cited

U.S. PATENT DOCUMENTS

| | | | |
|---|---|---|---|
| 7,804,076 B2 | 9/2010 | Huang et al. | |
| 10,074,508 B2 | 9/2018 | Baggett et al. | |
| 11,651,933 B1 * | 5/2023 | Ngo | H01J 37/08 313/613 |
| 2022/0154328 A1 | 5/2022 | Ishida | |

* cited by examiner

*Primary Examiner* — Georgia Y Epps
*Assistant Examiner* — Hanway Chang
(74) *Attorney, Agent, or Firm* — Nields, Lemack & Frame, LLC

(57) ABSTRACT

An insulator that may be self-centering is disclosed. The insulator includes an alignment feature that allows it to self-center during installation. In some embodiments, the insulator is created with a captive fastener with a specific alignment feature. The internal cavity of the insulator is formed so as to have a corresponding alignment feature. When tightened, the captive fastener is pressed into the alignment feature of the internal cavity, allowing it to self-center. In other embodiments, the mating electrode is also modified to include a corresponding alignment feature. For example, in some embodiments, the alignment feature on the electrode comprises a specially shaped depression, while the insulator has a corresponding protrusion. In other embodiments, the insulator also has a protective shield.

15 Claims, 8 Drawing Sheets

SELF-CENTERING VOLTAGE STANDOFF

FIELD

Embodiments of the present disclosure relate to an insulator, and more particularly an insulator that is able to self-center when installed in an ion implantation system.

BACKGROUND

Ion implantation is a common technique to introduce impurities into a workpiece to affect the conductivity of portions of that workpiece. For example, ions that contain elements in Group III, such as boron, aluminum and gallium, may be used to create P-type regions in a silicon workpiece. Ions that contain elements in Group V, such as phosphorus and arsenic, may be used to create N-type regions in the silicon workpiece. Of course, other species may also be used.

In some ion implantation systems, ions are generated in an ion source and are extracted through an extraction aperture. In some embodiments, one or more electrodes, which are electrically biased, are located outside the ion source, proximate the extraction aperture. The voltage applied to one of these electrodes serves to attract ions from within the ion source such that the ions exit the ion source through the extraction aperture.

Insulators may be located between the ion source and each of the electrodes to maintain different voltages on each of these components. Additionally, insulators may be located in other locations, such as between conductive rods in an electrostatic filter, as feet for various sections or the system and in other locations. Thus, the placement of the insulators is not limited.

Traditionally, the insulators have flat ends which rest on electrodes that also contain flat surfaces. This prevents tilt but does not provide in plane location. For example, the holes through which the fasteners pass are typically slightly larger than the diameter of the fasteners, allowing movement in the two perpendicular directions along the plane of the flat electrodes. Thus, during installation, when the insulator is being fastened to the electrode, the insulator may not be perfectly aligned. Therefore, in many systems, a fixture is utilized during the installation process to ensure that the insulator is properly aligned. However, this process may be time consuming, as the insulator is first loosely attached to the electrode, then the fixture is used to align the components, before the insulator is firmly attached to the electrode. Further, thermals may cause components to expand at different rates, which may cause the attachment to loosen, affecting the alignment.

Therefore, it would be advantageous if there were an insulator that could self-center during the installation process.

SUMMARY

An insulator that may be self-centering is disclosed. The insulator includes an insulator alignment feature that allows it to self-center during installation. In some embodiments, the insulator is created with a captive fastener that has a specific alignment feature. The internal cavity of the insulator is formed so as to have a corresponding insulator alignment feature. When tightened, the captive fastener is pressed into the insulator alignment feature of the internal cavity, allowing it to self-center. In other embodiments, the mating electrode is also modified to include a corresponding alignment feature. For example, in some embodiments, the alignment feature on the electrode comprises a specially shaped depression, while the insulator has a corresponding protrusion. In other embodiments, the insulator also has a protective shield.

According to one embodiment, a system for electrically isolating a component is disclosed. The system comprises a self-centering insulator, wherein the self-centering insulator has an insulator alignment feature; and an electrode, having a corresponding alignment feature, wherein the insulator alignment feature is disposed in the corresponding alignment feature of the electrode and a fastener is used to secure the self-centering insulator to the electrode.

In some embodiments, the body of the self-centering insulator is cylindrical. In certain embodiments, the insulator alignment feature is disposed at an end of the self-centering insulator, and the corresponding alignment feature of the electrode comprises a depression having a corresponding shape. In some embodiments, the insulator alignment feature comprises an end shaped as a rounded dome, and the corresponding alignment feature of the electrode is a depression having a corresponding shape. In some embodiments, the insulator alignment feature comprises an end shaped as a truncated cone and the corresponding alignment feature of the electrode is a depression having a corresponding shape. In some embodiments, an end of the self-centering insulator comprises a tapered portion and a cylindrical portion, wherein the tapered portion is the insulator alignment feature. In certain embodiments, the self-centering insulator comprises a protective shield disposed over an exterior surface of the body.

In some embodiments, the self-centering insulator is spherical, and the corresponding alignment feature of the electrode is a depression having a corresponding shape. In some embodiments, the self-centering insulator is bipyramidal in shape, and a corner of the self-centering insulator is the insulator alignment feature, and the electrode comprises a depression having a corresponding shape. In some embodiments, more than two electrodes are fastened to corners of the self-centering insulator. In some embodiments, the self-centering insulator is shaped as two cones with bases that are adjacent to one another, and an end of each of the two cones is the insulator alignment feature, and the corresponding alignment feature of the electrode is a depression having a corresponding shape.

In certain embodiments, the insulator alignment feature comprises an indentation on an end of the self-centering insulator, and the corresponding alignment feature in the electrode comprises an outward extending protrusion having a corresponding shape.

According to another embodiment, a self-centering insulator is disclosed. The self-centering insulator comprises a body made of an insulating material, having an internal cavity having a single opening in communication with an exterior of the self-centering insulator; and a captive fastener disposed in the internal cavity, wherein the internal cavity has an insulator alignment feature and the captive fastener has a corresponding alignment feature. In some embodiments, the captive fastener has a threaded hole and walls including a tapered portion wherein the walls are sloped, and the internal cavity is formed with sidewalls having a tapered portion having a same slope as the tapered portion of the captive fastener. In some embodiments, the sidewalls also comprise a cylindrical portion, wherein the cylindrical portion is disposed between the tapered portion and the single opening. In certain embodiments, the captive fastener also has a cylindrical portion having a diameter smaller than a diameter of the cylindrical portion of the sidewalls. In certain embodiments, the cylindrical portion of the captive fastener extends beyond the body of the self-centering insulator.

According to another embodiment, a system for passing a member through an electrode is disclosed. The system comprises an electrode having a hole passing therethrough, wherein the hole passes through a depression on a surface of the electrode; a member; and a feedthrough having a hollow body and a protective hollow cylinder disposed at an end of the hollow body, wherein the member passes through the hollow body and the protective hollow cylinder and wherein the protective hollow cylinder is disposed in the hole; wherein an interface between the hollow body and protective hollow cylinder forms an insulator alignment feature; and wherein the depression has a corresponding alignment feature. In some embodiments, the insulator alignment feature comprises tapered walls between the hollow body and the protective hollow cylinder; and the depression has sloped walls that correspond to the tapered walls. In certain embodiments, the member is conductive.

According to another embodiment, an ion implantation system is disclosed. The ion implantation system comprises an ion source; a mass analyzer; a mass resolving aperture; an acceleration/deceleration stage; a workpiece holder; and a self-centering insulator; wherein the self-centering insulator is used to electrically insulate a first component from a second component, wherein the self-centering insulator comprises an insulator alignment feature; and the first component has a corresponding alignment feature, wherein the insulator alignment feature is disposed in the corresponding alignment feature of the first component and a fastener is used to secure the self-centering insulator to the first component. In some embodiments, the ion implantation system comprises extraction optics disposed proximate an extraction aperture of the ion source to extract ions from the ion source, wherein the extraction optics comprises one or more electrodes; and the first component comprises one of the one or more electrodes in the extraction optics. In some embodiments, the acceleration/deceleration stage comprises one or more biased rods; and the first component comprises one of the one or more biased rods in the acceleration/deceleration stage.

BRIEF DESCRIPTION OF THE FIGURES

For a better understanding of the present disclosure, reference is made to the accompanying drawings, which are incorporated herein by reference and in which.

DETAILED DESCRIPTION

Figure 1:
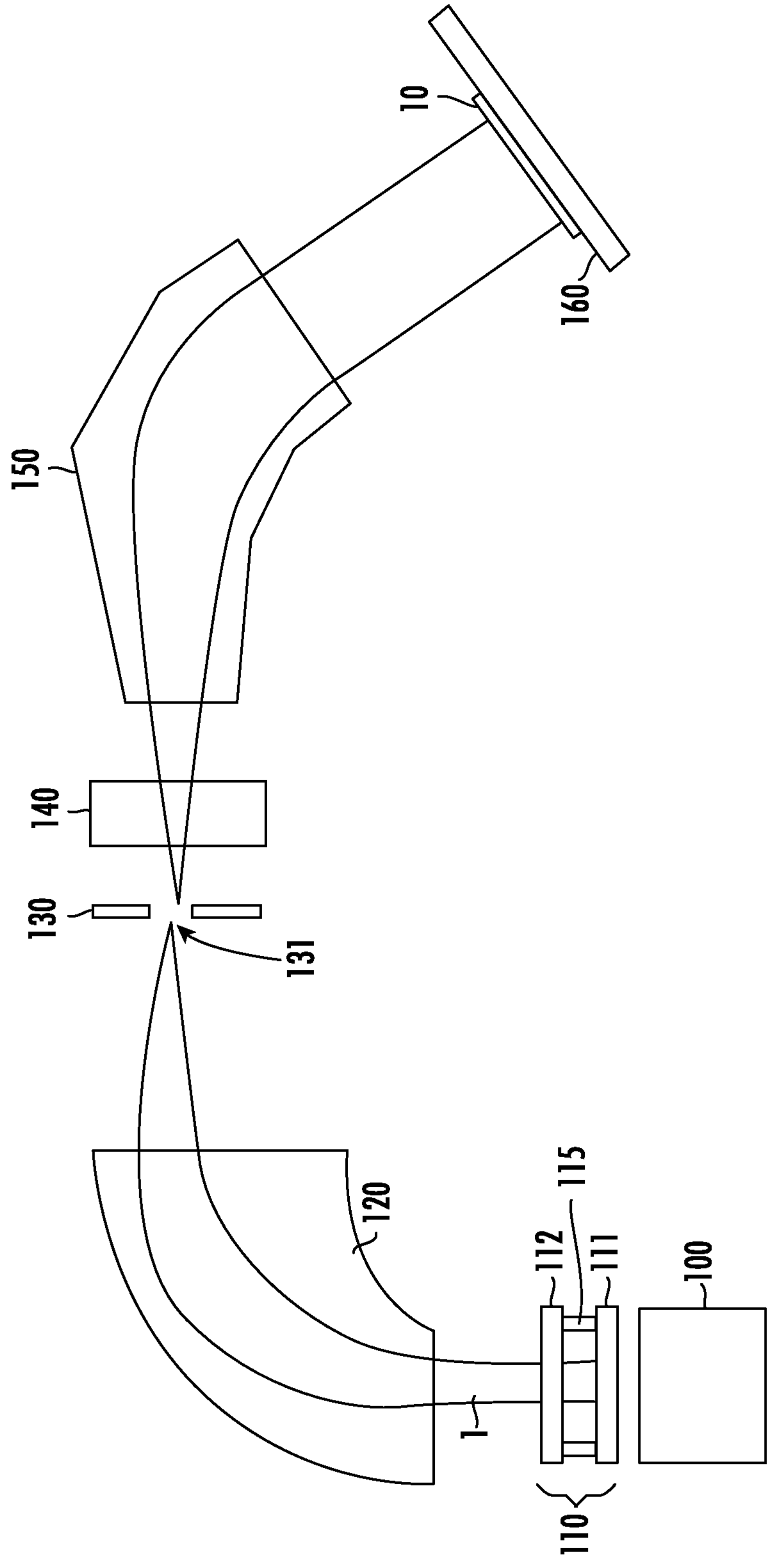
FIG. 1 is an ion implanter that utilizes the insulator according to one embodiment.

FIG. 1 shows an ion implantation system that may be used for implanting ions into a workpiece using an ion beam according to one embodiment.

The ion implantation system includes an ion source 100 comprising a plurality of chamber walls defining an ion source chamber. In certain embodiments, the ion source 100 may be an RF ion source. In this embodiment, an RF antenna may be disposed against a dielectric window. This dielectric window may comprise part or all of one of the chamber walls. The RF antenna may comprise an electrically conductive material, such as copper. An RF power supply is in electrical communication with the RF antenna. The RF power supply may supply an RF voltage to the RF antenna. The power supplied by the RF power supply may be between 0.1 and 10 kW and may be any suitable frequency, such as between 1 and 100 MHz. Further, the power supplied by the RF power supply may be pulsed.

In another embodiment, the ion source 100 may be an IHC ion source. In this embodiment, a cathode is disposed within the ion source chamber. A filament is disposed behind the cathode and energized so as to emit electrons. These electrons are attracted to the cathode, which in turn emits electrons into the ion source chamber. This cathode may be referred to as an indirectly heated cathode (IHC), since the cathode is heated indirectly by the electrons emitted from the filament.

Other embodiments are also possible. For example, the plasma may be generated in a different manner, such as by a Bernas ion source, a capacitively coupled plasma (CCP) source, microwave or ECR (electron-cyclotron-resonance) ion source. The manner in which the plasma is generated is not limited by this disclosure.

One chamber wall, referred to as the extraction plate, includes an extraction aperture. The extraction aperture may be an opening through which the ions 1 generated in the ion source chamber are extracted and directed toward a workpiece 10. The extraction aperture may be any suitable shape. In certain embodiments, the extraction aperture may be oval or rectangular shaped.

Disposed outside and proximate the extraction aperture of the ion source 100 are extraction optics 110. In certain embodiments, the extraction optics 110 comprise one or more electrodes. In certain embodiments, the extraction optics 110 comprises a suppression electrode 111, which is negatively biased relative to the plasma so as to attract ions through the extraction aperture. The suppression electrode 111 may be electrically biased using a suppression power supply (not shown). The suppression electrode 111 may be biased so as to be more negative than the extraction plate of the ion source 100. In certain embodiments, the suppression electrode 111 is negatively biased by the suppression power supply, such as at a voltage of between −3 kV and −15 kV.

In some embodiments, the extraction optics 110 includes a ground electrode 112. The ground electrode 112 may be disposed proximate the suppression electrode 111. The ground electrode 112 may be electrically connected to ground. Of course, in other embodiments, the ground electrode 112 may be biased using a separate power supply.

In other embodiments, the extraction optics 110 may comprise in excess of two electrodes, such as three electrodes or four electrodes. In these embodiments, the electrodes may be functionally and structurally similar to those described above, but may be biased at different voltages.

Each electrode in the extraction optics 110 may be a single electrically conductive component with an aperture disposed therein. Alternatively, each electrode may be comprised of two electrically conductive components that are spaced apart so as to create the aperture between the two components. The electrodes may be a metal, such as tungsten, molybdenum or titanium. One or more of the electrodes may be electrically connected to ground. In certain embodiments, one or more of the electrodes may be biased using an electrode power supply. The electrode power supply may be used to bias one or more of the electrodes relative to the ion source so as to attract ions through the extraction aperture. The extraction aperture and the apertures in the extraction optics 110 are aligned such that the ions 1 pass through apertures.

The electrodes in the extraction optics 110 may be separated, both physically and electrically, through the use of one or more insulators 115. Further, in some embodiments, insulators 115 are also used to separate the ion source 100 from the suppression electrode 111.

Located downstream from the extraction optics 110 is a mass analyzer 120. The mass analyzer 120 uses magnetic fields to guide the path of the extracted ions 1. The magnetic fields affect the flight path of ions according to their mass and charge. A mass resolving device 130 that has a resolving aperture 131 is disposed at the output, or distal end, of the mass analyzer 120. By proper selection of the magnetic fields, only those ions 1 that have a selected mass and charge will be directed through the resolving aperture 131. Other ions will strike the mass resolving device 130 or a wall of the mass analyzer 120 and will not travel any further in the system.

A collimator 140 may be disposed downstream from the mass resolving device 130. The collimator 140 accepts the extracted ions 1 that pass through the resolving aperture 131 and creates a ribbon ion beam formed of a plurality of parallel or nearly parallel beamlets. In other embodiments, the ion beam may be a spot beam. In this embodiment, an electrostatic scanner is used to move the spot beam in the first direction, as defined below.

Located downstream from the collimator 140 may be an acceleration/deceleration stage 150. The acceleration/deceleration stage 150 may be an electrostatic filter The electrostatic filter is a beam-line lens component configured to independently control deflection, deceleration, and focus of the ion beam. Located downstream from the acceleration/deceleration stage 150 is the movable workpiece holder 160.

In some embodiments, one or more lenses may be disposed along the beam line. A lens may be disposed before the mass analyzer 120, after the mass analyzer 120, before the collimator 140 or another suitable location.

The workpiece 10, which may be, for example, a silicon wafer, a silicon carbide wafer, or a gallium nitride wafer, is disposed on a movable workpiece holder 160.

In certain embodiments, the forward direction of the ion beam is referred to as the Z-direction, the direction perpendicular to this direction and horizontal may be referred to as the first direction or the X-direction, while the direction perpendicular to the Z-direction and vertical may be referred to as the second direction or Y-direction.

Thus, in operation, the movable workpiece holder 160 moves in the second direction from a first position, which may be above the ion beam to a second position, which may be below the ion beam. The movable workpiece holder 160 then moves from the second position back to the first position. The ion beam is wider than the workpiece 10 in the first direction, ensuring that the entirety of the workpiece 10 is exposed to the ion beam.

In certain embodiments, sensors are used to monitor the ion beam. For example, Faraday cups may be used to measure the beam current at or near the workpiece. Other beam monitoring devices may also be employed. These other beam monitoring devices may include multipixel profilers, dose cups, and set up cups.

In addition to the use of insulators between the electrodes in the extraction optics, insulators 115 may also be used in conjunction with electrical feedthroughs, Faraday sensors, electrostatic cups, lenses and high voltage stacks. For example, insulators may be disposed in the acceleration/deceleration stage 150 to provide electrical feedthroughs for the biased rods.

In other embodiments, the insulators may be used as electrical feedthroughs to supply voltage through the chamber walls of the ion source 100.

In some embodiments, an insulator is used to isolate the one or more lenses from ground. In other embodiments, an insulator may be used to isolate the Faraday cups or beam monitoring devices from ground.

Of course, any component that is maintained at a voltage that is different from the voltage of surrounding components (or from ground) may be isolated using the insulator described herein.

As noted above, the surface of the electrode to which the insulator is affixed is typically flat. Therefore, there may be misalignment of the insulator with respect to the surface to which it is being attached.

In all of the embodiments described herein, the insulator may be constructed using a suitable nonconductive material. Suitable materials for use include aluminum oxide ($Al_2O_3$), zirconium oxide ($ZrO_3$), yttrium oxide ($YO_3$) or a combination of these. Due to the shape of the insulator, it may be preferable to construct the insulator using an additive manufacturing process, such as stereolithography. In addition to the ability to create the desired shapes, additive manufacturing also allows the insulator to be constructed as one unitary component.

Further, in the embodiments described below, a system is described, wherein the system is used to isolate a biased electric component, such as an electrode from another component. In certain embodiments, the system includes at least one electrode and an insulator, where the electrode and insulator may be any of those described below.

Figure 2C:
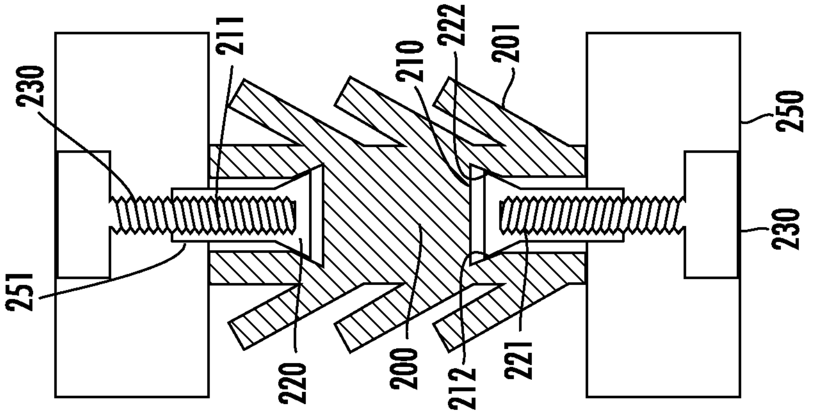
FIGS. 2A-2C show an insulator according to several embodiments.
Figure 2B:
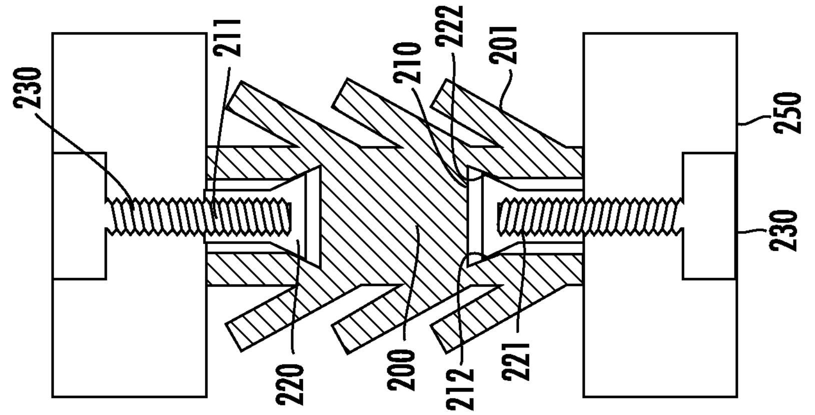
Figure 2A:
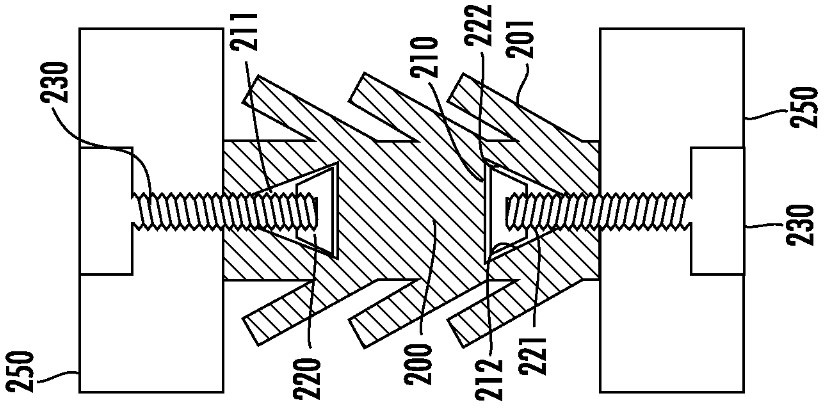

FIGS. 2A-2C show several embodiments of an insulator 200 that may self-align as it is being installed to an electrode 250. In this disclosure, "alignment" or "centering" refers to alignment in the tilt direction, as well as alignment in the in-plane directions. In other words, if the insulator is disposed between two flat plates, alignment refers to the tilt of the insulator, as well as its position, in two perpendicular directions, on the surface of the two plates. As noted above, the diameter of the holes in the electrodes 250 through which the fasteners pass is typically slightly larger than the diameter of the fastener, allowing movement of the fastener along the plane of the electrode 250. The insulators described herein overcome this issue.

In each of these embodiments, the insulator 200 includes a body with an internal cavity 210, which holds a captive fastener 220. The insulator 200 may have exterior fins 201, a lattice, protrusions, or other structures that increase the tracking length. The body of the insulator 200 may be cylindrical in shape. The internal cavity 210 has a single opening 211 in communication with the exterior of the insulator 200, into which a bolt or screw 230 may enter. The captive fastener 220, which may be a nut, is sized such that it cannot pass through the opening 211. The captive fastener 220 also include a threaded hole 221 into which the bolt or screw is secured. Further, in each embodiment, the internal cavity 210 is formed so as to have an insulator alignment feature. The captive fastener 220 has a corresponding alignment feature.

In FIG. 2A, the captive fastener 220 is formed so as to have walls 222 that are sloped as well as a threaded hole 221. The walls 222 may be configured so that the captive fastener 220 is narrower near the opening 211 and wider moving away from the opening 211. The internal cavity 210 may be constructed to have sidewalls 212 that have the same slope and separation as the walls 222 of the captive fastener 220. In other words, the separation between the sidewalls 212 is narrower near the exterior of the insulator 200 than near the internal cavity 210. In this way, as the screw 230 is tightened, the captive fastener 220 is drawn to the sidewalls 212 of the internal cavity 210, ensuring alignment between the electrode 250 and the insulator 200.

FIG. 2B shows a variation of the design shown in FIG. 1A. In FIG. 2A, the sidewalls 212 are tapered throughout the entirety of the internal cavity 210. However, to maintain alignment, only a portion of the sidewalls 212 may be tapered. FIG. 2B shows the sidewalls 212 having a tapered portion near the internal cavity 210 and a cylindrical portion near the opening 211. The captive fastener 220 may be as described above. In another embodiment, the walls 222 of the captive fastener 220 may also have a tapered portion and a cylindrical portion, where the diameter of the cylindrical portion is smaller than the diameter of the cylindrical portion of the sidewalls 212. In this configuration, the tapered portion of the walls 222 of the captive fastener 220 are pressed against the tapered portion of the sidewalls 212 when installed.

In FIGS. 2A-2B, the surface of the electrode 250 that mates with the insulator 200 remains flat. However, there are other variations. FIG. 2C shows a variation of FIG. 2B, where the cylindrical portion of the captive fastener 220 extends beyond the body of the insulator 200 and into the electrode 250. In this embodiment, a depression 251 is formed in the surface of the electrode 250 which holds the portion of the captive fastener 220 that extends beyond the insulator 200. The diameter of the depression 251 is larger than the diameter of the cylindrical portion of the wall of the captive fastener 220. In this embodiment, the tapered portion of the walls 222 of the captive fastener 220 are pressed against the tapered portion of the sidewalls 212 when installed. The cylindrical portion of the walls 222 may or may not contact the electrode 250.

Thus, in each of these embodiments, the insulator alignment feature is the sidewall 212 of the internal cavity 210 of the insulator 200, which is tapered. The corresponding alignment feature comprises a similarly tapered wall on a captive fastener 220. The tapered portions of the sidewall 212 and wall 222 serve to self-align the insulator 200 to the electrode 250.

Figure 3C:
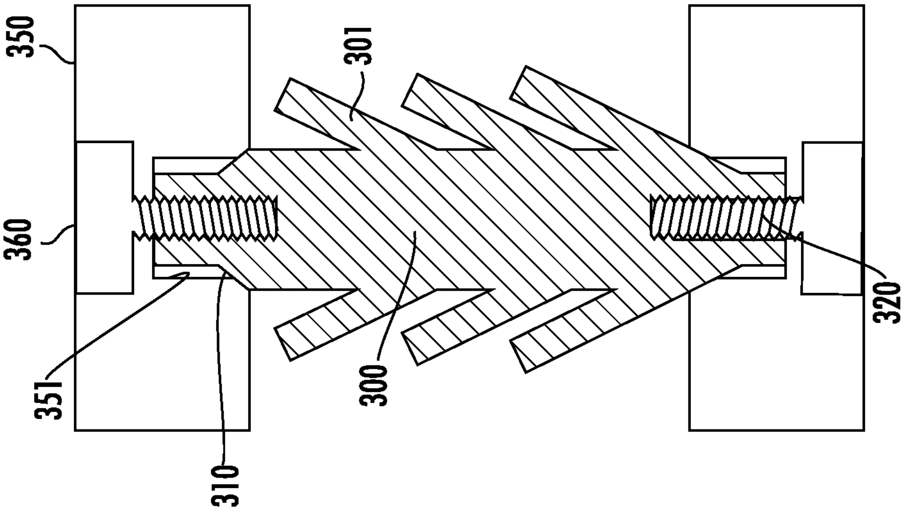
FIGS. 3A-3C show an insulator with a mating electrode according to several embodiments.
Figure 3B:
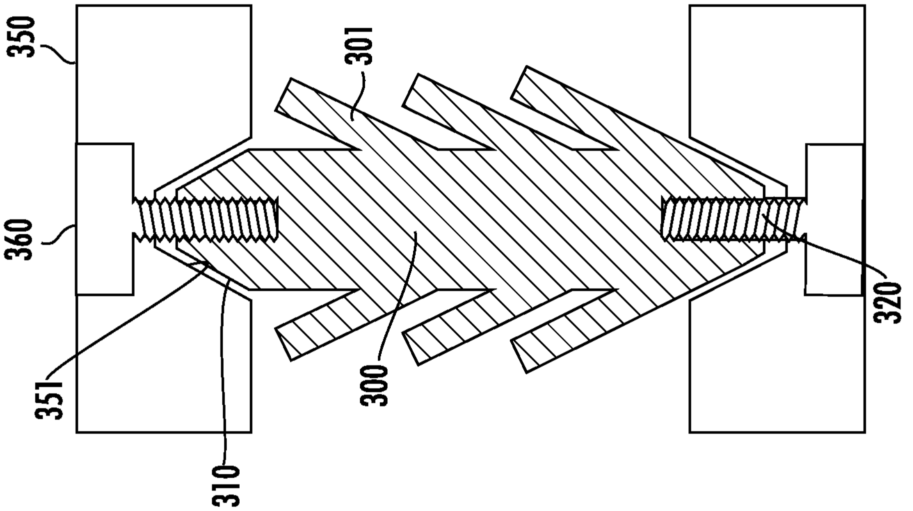
Figure 3A:
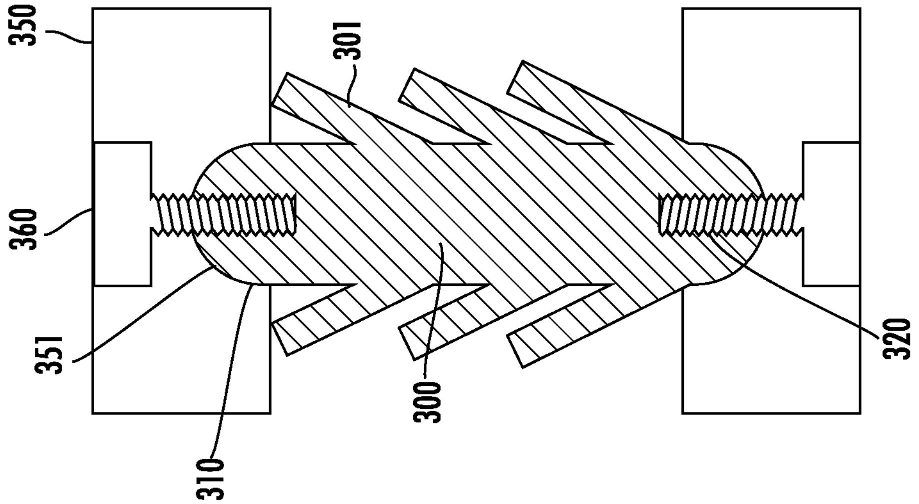

Other embodiments are also possible that utilize an alignment feature that is located both on the electrode and on the insulator. FIGS. 3A-3C show several of these embodiments. In each of these embodiments, the insulator 300 may contain fins 301 along its outer surface to increase tracking length. Further, the ends of the insulator 300 have insulator alignment features. Additionally, the electrodes each have a depression having a corresponding alignment feature.

In FIG. 3A, the ends 310 of the insulator 300 are each formed as rounded domes, with a threaded opening 320. The surface of the electrode 350 contains a depression 351, which has a corresponding shape as the ends 310 of the insulator 300. The screw 360 passes through an opening in the electrode 350, through the depression 351, and is fastened to the threaded opening 320 in the insulator 300. The rounded dome mates with the depression 351, serving to self-align the insulator 300 with the electrode 350. In some embodiments, the rounded dome may be semi-spherical. In other embodiments, the rounded dome may be more oblong.

In FIG. 3B, the ends 310 of the insulator 300 are tapered, forming a truncated cone with a threaded opening 320. As described above, the surface of the electrode 350 contains a depression 351, which has a corresponding shape as the ends 310 of the insulator 300. Thus, the depression 351 may be conical in shape. The screw 360 passes through an opening in the electrode 350, through the depression 351, and is fastened to the threaded opening 320 in the insulator 300. The truncated cone mates with the depression 351, serving to self-align the insulator 300 with the electrode 350.

In FIGS. 3A-3B, the depression 351 and the end 310 of the insulator 300 had matching shapes, such that the entirety or nearly the entirety of the end 310 of the insulator 300 contacted the electrode 350. However, in some embodiments, the entirety of the depression 351 is not in contact with the end 310 of the insulator 300. For example, FIG. 3C shows an embodiment, where the end 310 of the insulator 300 has a tapered portion and a cylindrical portion. The depression 351 in the electrode 350 also includes a tapered portion and a cylindrical portion. However, the cylindrical portion of the depression 351 has a larger diameter than the cylindrical portion of the end 310 of the insulator 300, such that the insulator 300 only contacts the electrode 350 along the tapered portions when tightened with the screw 360. Thus, FIGS. 3B-3C use the tapered end of the insulator as the insulator alignment feature and a corresponding shaped depression as the corresponding alignment feature. In contrast, FIG. 3A uses the rounded end of the insulator as the insulator alignment feature and a corresponding rounded depression in the electrode as the corresponding alignment feature.

FIGS. 2A-2C and 3A-3C show insulators that have a conventional shape, which may include a body having a cylindrical shape with protrusions. In these embodiments, the modification to the insulator to allow self-alignment is limited to changes to the ends of the insulator, and optionally changes to the surface of the electrode. However, the insulator may have other shapes.

Figure 4:
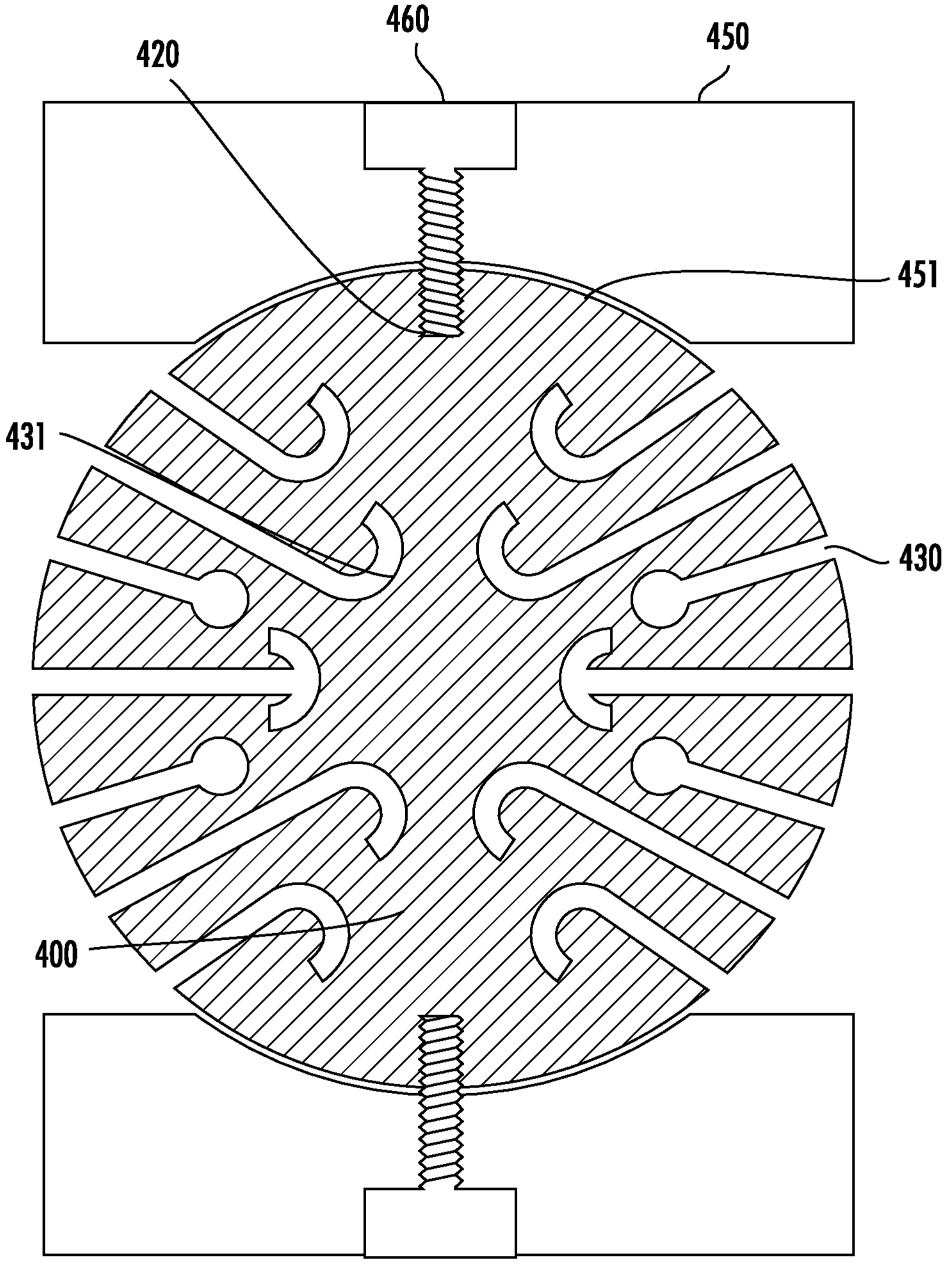
FIG. 4 shows an insulator according to another embodiment.

FIG. 4 shows an insulator 400 that is spherical in shape. The electrode 450 has a depression 451 that matches the radius of curvature of the insulator 400. As described above, the insulator 400 may include a threaded opening 420. In addition, a hole passes through the depression 451. In this way, the insulator 400 contacts the depression 451 when tightened by the screw 460. Further, rather than utilizing fins, the insulator 400 may have a plurality of indentations 430 that serve to increase the tracking length. Further, in certain embodiments, the indentations 430 are created to have internal twists 431 such that there is no line of sight to at least a portion of the indentation 430. This may be done using an additive manufacturing technique. Thus, the outer surface of the insulator 400 serves as the insulator alignment feature, while the depression 451 in the electrode 450 serves as the corresponding alignment feature.

Figure 5B:
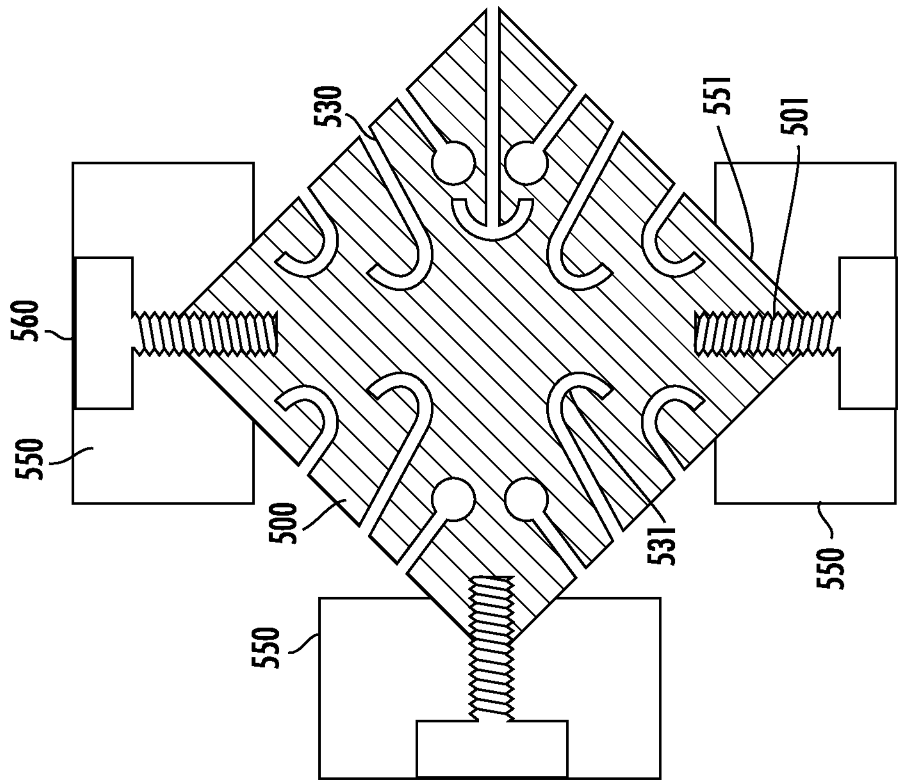
FIGS. 5A-5B show an insulator according to another embodiment.
Figure 5A:
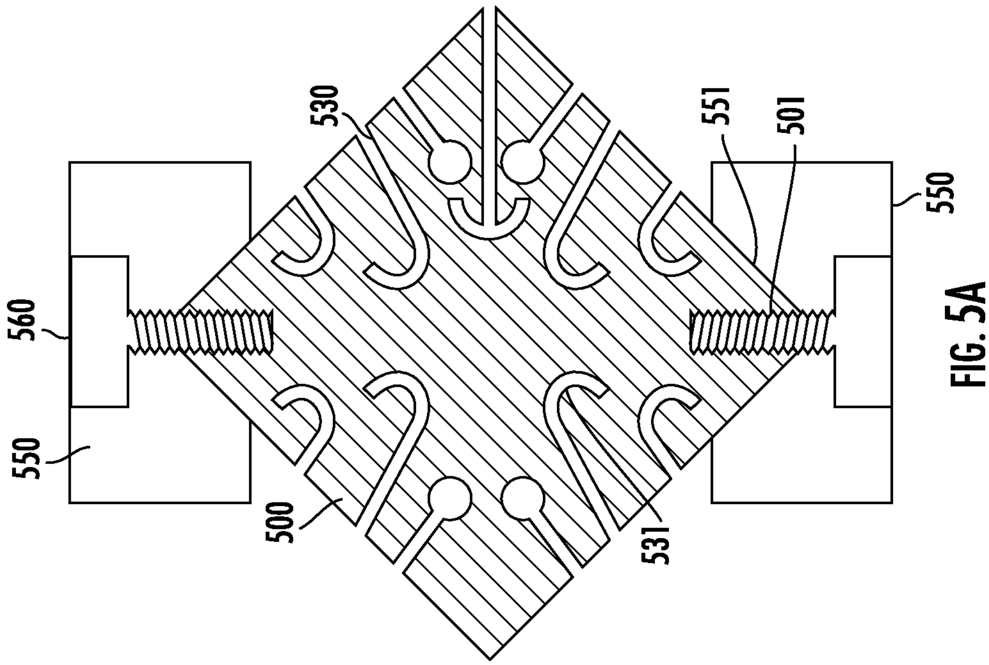

FIGS. 5A-5B shows another embodiment where the insulator 500 is not cylindrical. In this embodiment, the insulator 500 is an octahedron, such as a square bipyramid. Two opposite corners may be used to interface with two electrodes 550. The electrodes 550 each have a depression 551 that corresponds to the shape of the corner of the insulator 500. For example, if the insulator is a square bipyramid, the depression may have four sloping walls that terminate as a square on the surface of the electrode 550. The corners of the insulator 500 may have threaded openings 501. As the screw 560 is tightened in the threaded opening 501, the corner of the insulator 500 is pressed against the depression 551, ensuring that the insulator 500 is aligned. Note that this shape of insulator also prevents rotation of the insulator 500 relative to the electrode 550. While the insulator 500 may be an octahedron, it may also be formed as a hexahedron. The hexahedron may be a cube, or a triangular bipyramid. In another embodiment, the insulator 500 is shaped as a two cones whose bases are adjacent to one another. In this embodiment, the depression 551 may be conical in shape. Thus, in these embodiments, the corner of the insulator 500 serves as the insulator alignment feature, while the depression 551 in the electrode 550 serves as the corresponding alignment feature.

As described with respect to FIG. 4, the insulator 500 has a plurality of indentations 530 that serve to increase the tracking length. Further, in certain embodiments, the indentations 530 are created to have internal twists 531 such that there is no line of sight to at least a portion of the indentation 530.

Because the insulator 500 has more than two corners, it is possible to attach more than two electrodes to this insulator 500. FIG. 5B shows a third electrode 550, which is affixed to a third corner. The third electrode 550 also includes the depression 551 that corresponds to the shape of the corner. Note that, while not shown, additional electrodes may be attached to the other corners of the insulator 500. Note that this configuration is also possible with the insulator 400 shown in FIG. 4. Thus, in certain embodiments, the insulator has a shape that allows the attachment of more than two electrodes, while being self-centering.

While cones, domes and pyramids are described as being alignment features, the disclosure is not limited to these shapes. For example, the end of the body of the insulator may have a different protruding shape, and the electrode may have a depression that corresponds to the shape of the end of the insulator. Thus, other shapes, may also be used.

Figure 8B:
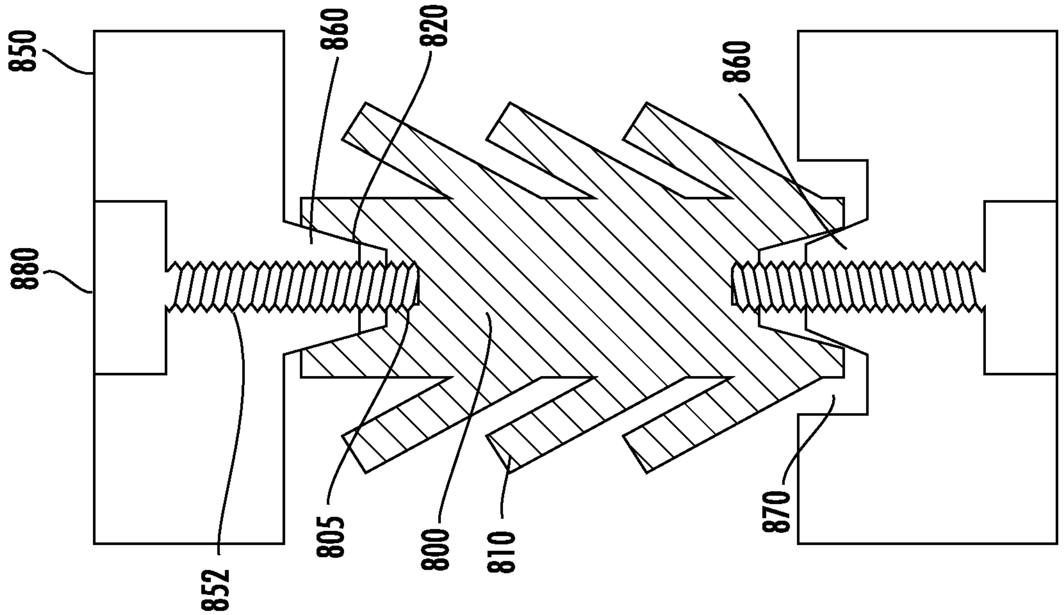
FIGS. 8A-8B show an insulator according to other embodiments.
Figure 8A:
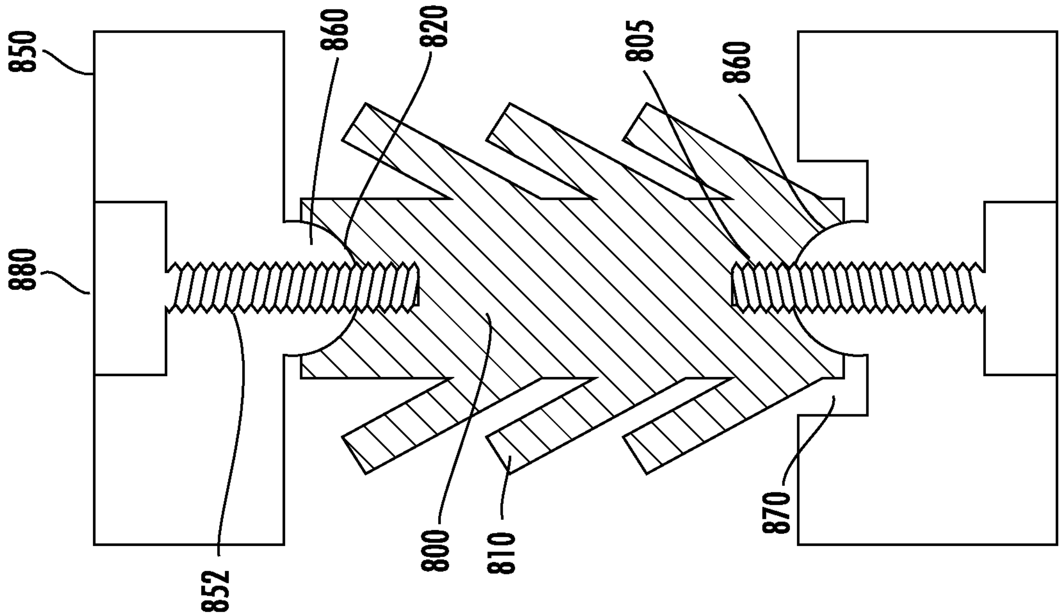

Additionally, in each of the embodiments described above, the insulator has a protruding insulator alignment feature, while the electrode has a corresponding depression. However, this may be reversed, such that the protrusion extends from the electrode and the insulator has a corresponding depression. FIGS. 8A-8B show embodiments that are similar to FIGS. 3A-3B, respectively, but the protrusion is now on the electrode. This configuration may also apply to other embodiments described above. As described above, the insulator 800 has protrusions 810 to increase tracking length. The screw 880 passes through an opening 852 in the electrode 850, through the protrusion 860, and is fastened to the threaded opening 805 in the insulator 800. Note that FIG. 8A shows that the insulator alignment feature of the insulator 800 is an indentation 820 as having a spherical shape. The two electrodes 850 each have an outward extending protrusion 860 that has a corresponding shape. Note that the top electrode creates the outward extending protrusion by adding additional material to the surface of the electrode. In contrast, note that the bottom electrode creates this outward extending protrusion 860 by removing material from the electrode in the region around the outward extending protrusion 860. Thus, the outward extending protrusion 860 actually rests in a depression 870, which has a depth that is at least as deep as the outward extending protrusion 860 is tall. In this way, by creating this depression 870 in a flat electrode, a corresponding alignment feature, in the shape of an outward extending protrusion 860, may be created. FIG. 8B shows a similar configuration. However, in this embodiment, the indentation 820 in the insulator 800 is conical in shape, while the outward extending protrusions 860 on the electrodes 850 have a corresponding shape. Again, the bottom electrode 850 has the outward extending protrusion 860 disposed in a depression 870. Thus, in these embodiments, the insulator alignment feature comprises an indentation 820, while the corresponding alignment feature in the electrode 850 is a protrusion 860, which may be disposed in a depression 870.

Figure 6B:
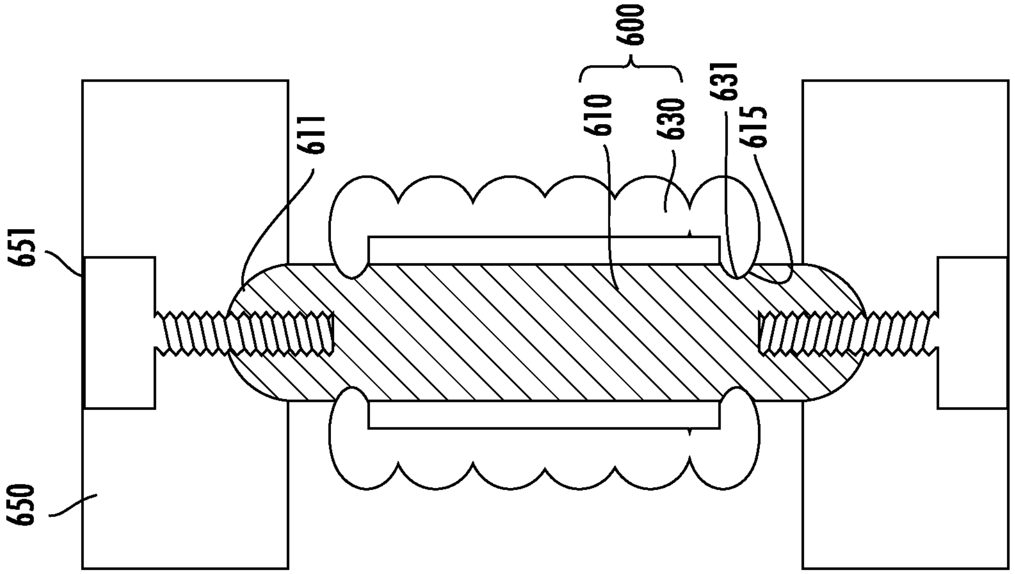
FIGS. 6A-6B show an insulator with a protective shield according to two embodiments.
Figure 6A:
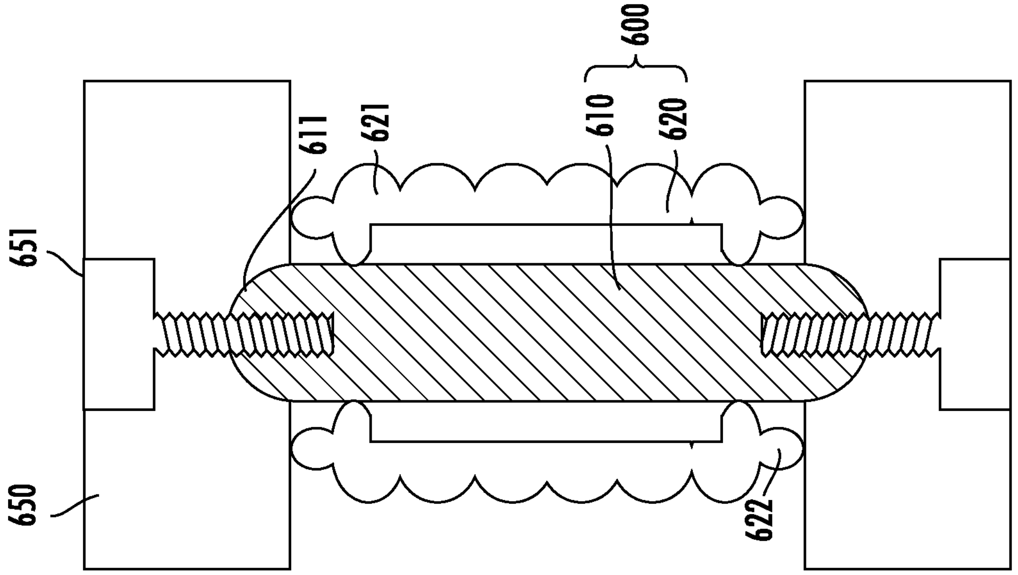

In certain embodiments, the insulator may be formed as separate pieces. FIGS. 6A-6B shows two embodiments. In these embodiments, the insulator 600 has a central structure 610 and a protective shield. The central structure 610 may be self-centering. For example, the central structure 610 may have rounded ends 611 similar to those shown in FIG. 3A to allow alignment. Alternatively, the ends may be similar to those shown in FIGS. 3B-3C. However, unlike the embodiments in FIGS. 3A-3C, the central structure 610 does not include fins. Rather, the central structure 610 is cylindrical and has ends that have an alignment feature.

In FIG. 6A, the protective shield 620 may be a hollow tube, having a plurality of fins or other protrusions 621 to increase tracking length. The ends of the protective shield 620 may include standoffs 622. The electrodes 650 have a hole through which a screw 651 passes and into a threaded opening in the central structure 610. To assemble the insulator, the protective shield 620 is slid over the central structure 610. The electrode 650 is then pressed against the central structure 610. As the screw 651 is tightened, the central structure 610 aligns and the protective shield 620 is held in place as the standoffs 622 press against electrodes 650 at both ends.

In FIG. 6B, the protective shield 630 is held in place by the central structure 610. The protective shield 630 has inward facing protrusions 631 that enter into corresponding grooves 615 disposed on the central structure 610. In this way, the protective shield 630 is held in place by the interaction between the inward facing protrusions 631 and the grooves 615. In some embodiments, the protective shield 630 and central structure 610 may be one assembly but sufficient clearance is left between the two pieces so that the protective shield 630 is able to rotate about the central structure 610, while being fixed in the height direction because of the presence of the protrusions and corresponding grooves.

Figure 7:
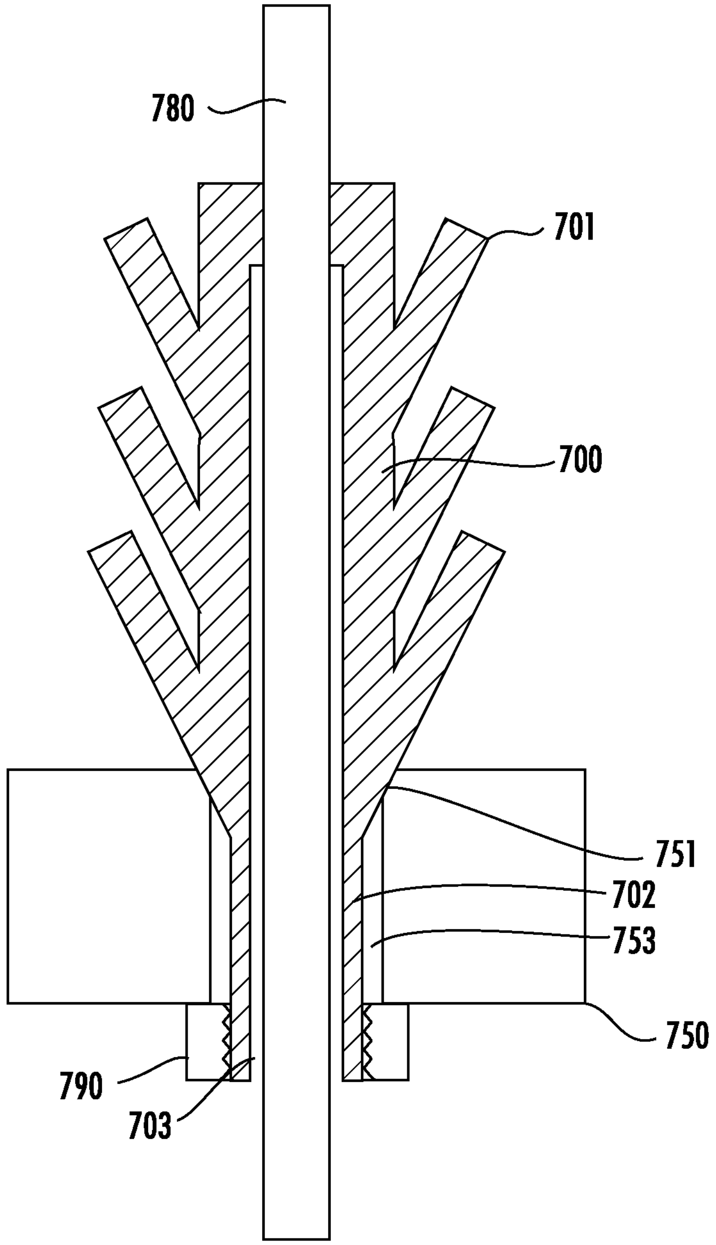
FIG. 7 shows an insulating feedthrough according to one embodiment.

While the previous embodiments described self-centering insulators, this concept may be extended to other components. For example, FIG. 7 shows an insulating feedthrough 700 that utilizes the insulator alignment feature. While FIG. 7 shows an insulator alignment feature that is similar to that shown in FIG. 3C, it is understood that other insulator alignment features, such as those shown in FIGS. 3A and 3B may be used. In this embodiment, the insulating feedthrough 700 comprises a hollow body, from which fins 701 protrude to increase tracking length. The insulating feedthrough also includes a protective hollow cylinder 702 located at the end of the hollow body, which is disposed within a hole 753 in the electrode 750. A conductive member 780, such as a metal rod, is passed through the hollow body and the protective hollow cylinder 702. The interface between the hollow body and the protective hollow cylinder 702 includes an alignment feature. In this embodiment, the insulator alignment feature comprises tapered sidewalls that are located between the hollow body and the protective hollow cylinder 702. A corresponding sloped depression 751 is disposed on the surface of the electrode 750 such that the hole 753 passes through the sloped depression 751. The distal end 703 of the protective hollow cylinder 702 is threaded, so as to allow the tightening of a nut 790. As the nut 790 is tightened, the tapered sidewalls of the insulating feedthrough 700 are pressed into the sloped depression 751, ensuring alignment.

While FIG. 7 describes a conductive member 780 passing through the hollow body, it is understood that the member may also be nonconductive to ensure that there is no electrical path between the components.

Further, while the above description describes the use of a self-centering insulator with an electrode, it is understood that the self-centering insulator may be used with other components, such as Faraday sensors, electrostatic cups, lenses and high voltage stacks. For example, insulators may be disposed in the acceleration/deceleration stage 150 to provide electrical feedthroughs for the biased rods.

The embodiments described above in the present application may have many advantages. The self-centering insulators eliminate the use of assembly fixtures to align components in plane while also preventing tilt. This reduces the downtime of equipment by shortening the time required for maintenance. Additionally, the embodiment shown in FIG. 6A reduces maintenance cost since the central structure is reusable. Additionally, differently shaped insulators, such as those in FIGS. 4 and 5A-5B allow the possibility of attaching more than two electrodes to one insulator.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for electrically isolating a component, comprising:

a self-centering insulator, wherein the self-centering insulator has an insulator alignment feature; and an electrode, having a corresponding alignment feature, wherein the insulator alignment feature is disposed in the corresponding alignment feature of the electrode and a fastener is used to secure the self-centering insulator to the electrode, wherein an entirety of the insulator alignment feature that contacts the corresponding alignment feature of the electrode is tapered or rounded.

2. The system of claim 1, wherein a body of the self-centering insulator is cylindrical.

3. The system of claim 2, wherein the insulator alignment feature is disposed at an end of the self-centering insulator, and the corresponding alignment feature of the electrode comprises a depression having a corresponding shape.

4. The system of claim 2, wherein the insulator alignment feature comprises an end shaped as a rounded dome, and the corresponding alignment feature of the electrode is a depression having a corresponding shape.

5. The system of claim 2, wherein the insulator alignment feature comprises an end shaped as a truncated cone and the corresponding alignment feature of the electrode is a depression having a corresponding shape.

6. The system of claim 2, wherein an end of the self-centering insulator comprises a tapered portion and a cylindrical portion, wherein the tapered portion is the insulator alignment feature.

7. The system of claim 2, further comprising a protective shield disposed over an exterior surface of the body.

8. The system of claim 1, wherein the self-centering insulator is spherical, and the corresponding alignment feature of the electrode is a depression having a corresponding shape.

9. The system of claim 1, wherein the self-centering insulator is bipyramidal in shape, and a corner of the self-centering insulator is the insulator alignment feature, and the electrode comprises a depression having a corresponding shape.

10. The system of claim 9, wherein more than two electrodes are fastened to corners of the self-centering insulator.

11. The system of claim 1, wherein the self-centering insulator is shaped as two cones with bases that are adjacent to one another, and an end of each of the two cones is the insulator alignment feature, and the corresponding alignment feature of the electrode is a depression having a corresponding shape.

12. The system of claim 1, wherein the insulator alignment feature comprises an indentation on an end of the self-centering insulator, and the corresponding alignment feature in the electrode comprises an outward extending protrusion having a corresponding shape.

13. An ion implantation system, comprising:

an ion source;

a mass analyzer;

a mass resolving aperture;

an acceleration/deceleration stage;

a workpiece holder; and a self-centering insulator;

wherein the self-centering insulator is used to electrically insulate a first component from a second component, wherein the self-centering insulator comprises an insulator alignment feature; and the first component has a corresponding alignment feature, wherein the insulator alignment feature is disposed in the corresponding alignment feature of the first component and a fastener is used to secure the self-centering insulator to the first component, wherein an entirety of the insulator alignment feature that contacts the corresponding alignment feature of the first component is tapered or rounded.

14. The ion implantation system of claim 13, further comprising extraction optics disposed proximate an extraction aperture of the ion source to extract ions from the ion source, wherein the extraction optics comprises one or more electrodes; and wherein the first component comprises one of the one or more electrodes in the extraction optics.

15. The ion implantation system of claim 13, wherein the acceleration/deceleration stage comprises one or more biased rods; and wherein the first component comprises one of the one or more in biased rods the acceleration/deceleration stage.

* * * * *